Feb. 28, 1967  R. E. STOKELY  3,306,679

RESILIENT DRIVELINE BEARING

Filed Dec. 31, 1964

INVENTOR
RAYMOND E. STOKELY
BY
Joseph W. Malleck
ATTY.

United States Patent Office
3,306,679
Patented Feb. 28, 1967

3,306,679
RESILIENT DRIVELINE BEARING
Raymond E. Stokely, Rockford, Ill., assignor to Borg-Warner Corporation, Chicago, Ill., a corporation of Illinois
Filed Dec. 31, 1964, Ser. No. 422,578
11 Claims. (Cl. 308—26)

This invention relates to shaft mountings, and particularly to mountings of the type which may be utilized in a support of a split driving shaft such as used in automotive vehicles (split driving shaft being comprehensive to include any series of rotary driving sections which are connected by any series of joints).

Due to the running loads in a vehicle drive shaft, dynamic forces act upon the shaft and upon a center bearing support member when used and tend to transmit vibration or noise through the bearing and its support and into the vehicle body. The dynamic forces may comprise secondary couple loads which result from transmitting rotary power at an angle, as well as forces resulting from slight unbalanced or misalignment of connected parts. These vibrations are best isolated by the use of a relatively radially soft or resilient mount for supporting the drive shaft center bearing on the vehicle frame or underbody.

Heretofore, prior constructions have contemplated the use of a rubber ring disposed between a fixed bracket and a bearing assembly; however, none of these prior art constructions have afforded any successful degree of angular or axial movement between the bracket and bearing (the angular or axial adjustments must be provided without changing the degree of damping effect which was designed into the resilient mount) while at the same time providing a long life commensurate with use that is contemplated. It is important to provide flexibility of movement of the shafting within the bearing mount for many reasons, among which are:

(a) There is an inherent stack-up of tolerances between parts in a drive-line when assembled which vary within predetermined limits. Such tolerances change the design dimension of the drive-line and can best be accommodated by a center bearing which adjusts during assemblage.

(b) A limited degree of concentric misalignment is inherent in drive-line between the bearing mount and the shafting rotating therein and if not accommodated contributes to an unsatisfactory assembly.

(c) A reduction in the number and models of angular brackets utilized in supporting split drive-lines by standardization of such pieces enabling the center bearing mount to accommodate angular variations up to as much as 20 degrees.

Therefore, a primary object of this invention is to provide an improved resilient center bearing mount for split shaft assemblage, such mount accommodating both axial as well as angular movement between the bearing and the fixed bracket or support.

Another object is to provide a resilient center bearing mount which not only has a successful transmissibility ratio comparable to that of prior art construction but also has the ability to absorb angular and axial misalignment to prevent destruction and pop-out of the resilient member during operation.

Yet another object of this invention is to provide an improved resilient center bearing mount comprising a plurality of radially extending resilient columns integrally formed on an annular resilient body, said columns and body having means for respectively maintaining adequate securement to said bracket and bearing respectively during all conditions of operation, said column being effective to yieldably accommodate axial and angular displacement between said bracket and bearing while maintaining uniform transmissibility; the mount of this object is particularly characterized by means obviating scrubbing or defective rolling contact of the resilient members interconnecting with the bracket or/and bearing which heretofore has been typical of the prior art.

Other objects and advantages of this invention will become apparent from the following detailed description taken in connection with the accompanying drawings in which.

Figure 1:
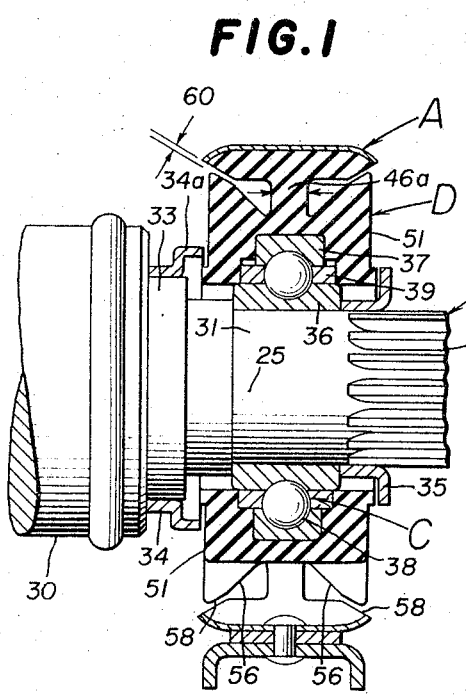
FIGURE 1 is an elevational view of a split-shaft center bearing assembly embodying the principles of this invention and illustrating certain portions in section taken substantially along the line 1—1 of FIGURE 2.
Figure 2:
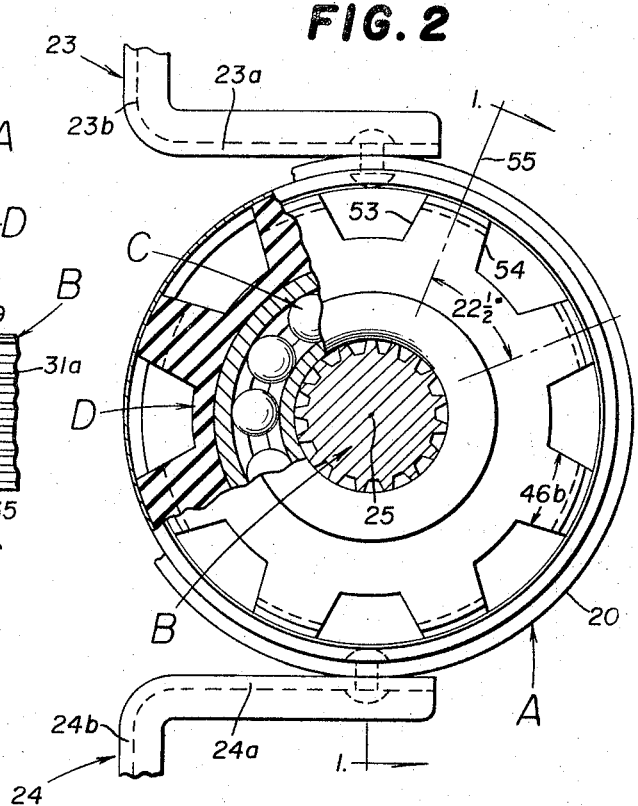
FIGURE 2 is a side view of the structure in FIGURE 1 with certain portions broken away.

Turning now to the drawings and more particularly to FIGURES 1 and 2, there is shown a preferred embodiment of this invention and broadly comprises a bracket A secured to a fixed portion of the vehicle and through which extends a rotary shaft means B in radially spaced relationship; a bearing means C is disposed about the shaft means and is resiliently mounted within the bracket A by a unique insulating ring D.

In more particularity, the bracket A comprises an annular cylindrical housing 20 provided at the axial extremity thereof with annular radially-inwardly flared lips 21 and 22. The housing and lips have a radially-inwardly facing continuous surface 20a which is generally semi-toroidal in shape. L-shaped feet 23 and 24 are disposed at opposite sides of the housing 20; each of the feet have one leg 23a and 24a attached respectively at diametrically opposite points of the housing; the other legs 23b and 24b of the feet lie in a common plane for attachment to the vehicle or other fixed member (not shown). Hereinafter, directional references shall be in respect to the central axis 25 of the cylindrical housing 20.

Shaft means B as shown in FIGURE 1, comprises a shaft section 30 having a reduced terminating portion 31 upon which is formed a plurality of splines 31a received in complementary splines of a slip joint (not shown). The shaft means shown may comprise a driving shaft comprised of any number of shaft sections interconnected by universal joints, or the invention may be employed in the embodiment of an overhead shaft system which does not include universal joints. Shaft means B has an intermediate stepped portion 33 upon which is mounted an annular dirt shield 34 having an annular lip 34a radially spaced outwardly from the portion 31. Another dirt shield 35 is carried on shaft portion 31. Bearing means C has inner and outer annular races 36 and 37 of differential widths; between the races is disposed a plurality of rollers 38 to provide a movable anti-friction support between said races. The inner race 36 is tightly fitted about the outer surface of the shaft portion 31 to turn therewith and the outer race 37 is held against rotation by attachment to the insulating ring D; the races are spaced by cage member 39.

The insulating ring D is comprised of a unitary body of resilient or flexible material such as soft rubber. The ring has an annular central body 40 provided with a central annular groove 41 within which is received the outer race 37 of the bearing; the groove is stepped to also receive the cage 39. A pair of radially-inwardly depending flanges 42 and 43 are provided on the body 40 and are adapted to nest inwardly but in spaced relationship with the dirt shields 34 and 35. The inner portion of body 40 is axially secured to the bearing for movement therewith by virtue of groove 41 receiving the races and cage 39.

Extending radially outwardly from the body 40 is a plurality of equicircumferentially spaced columns 45 each comprised of a neck 46 carrying a transverse head 47 at its radially outer extremity. Each of the necks 46 have a generally rectangular cross section provided with a width 46a which is approximately one half the length 46b; the height 46c of the neck is approximately equal to the width 46a. The transverse head 47 has an outer surface 48 integrally bonded to the interior surface 20a of the housing 20 and is contoured to the cylindrical portion and flared extremities thereof. Spaced on opposite sides of the column 45 are wings 49 and 50 extending generally radially outwardly toward the extremities 47a and 47b of said transverse head 47. Each of the wings has a flat axial end surface 51 (see FIGURE 1) lying in a plane which is generally perpendicular to the axis 25 of said housing 20 (the plane generally passing through the extremities of said head 47); the flat surfaces 51 of the pair of wings associated with each column are spaced axially apart a distance 52 generally five times the width 46a of the neck 46.

The pair of wings 50 and column 45 have common flat end surfaces 53 and 54 (see FIGURE 2) which lie in planes tending to converge radially outwardly with respect to the housing 20. As viewed in FIGURE 2, the centerline 55 of each of the columns 45 are circumferentially spaced apart approximately 22½ degrees, with the circumferential end surfaces 53 and 54 spaced apart an average arcuate distance approximately three times the width 46a of the necks 46.

Figure 3:
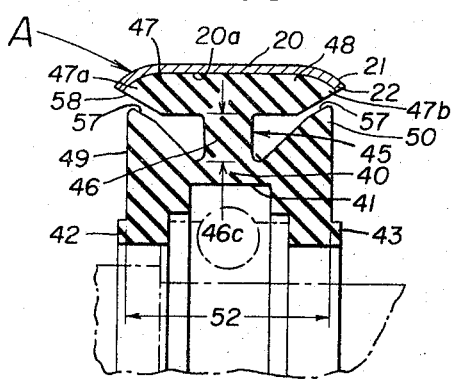
FIGURE 3 is an enlarged fragmentary sectional view of a portion of FIGURE 1 illustrating the resilient member in the neutral assembled condition.

The pair of wings 50 associated with each column have an interior conical surface 56 directed from the base of the neck 46 toward the axial extremities of the head 47. The extremities 47a and 47b of the transverse head of each column carry generally inward facing conical surfaces 58; the conical surface 56 has a step 57 formed near the radially outermost portion thereof to provide an identical mating surface to the conical surfaces 58 of each extremity 47a and 47b. In the unstressed neutral condition of the insulating ring D, as shown in FIGURES 1 and 3, the lateral spacing 60 between the conical surfaces 58 and 57 is slight.

Figure 4:
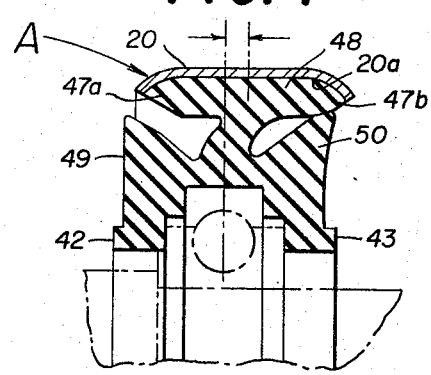
FIGURE 4 is a view like that in FIGURE 3 illustrating another condition of operation of said resilient member.

To accommodate axial movement of bearing means C relative to the housing 20, it can best be illustrated by discussing the movement of one column and associated wings 49 and 50, all of the columns acting in synchronization. As axial displacement begins to occur, resilient and flexible neck 46 is caused to bend about the width 46a thereof; after a slight degree of displacement, the space 60 between the conical surfaces 57 and 58 is taken up causing interengagement of said surfaces. Further axial displacement brings head 47 arcuately across the upper portion of the wings 50 causing the wings to bend progressively as shown in FIGURE 4. Radial transmissibility or support by the neck 46 is gradually lost as greater bending of the neck proceeds; however, an increase in transmissibility is afforded by the interengagement of head 47 with the wings which tend to offset the loss and generally maintaining the original unstressed transmissibility factor. Bending of column 45 progressively brings the head 47 radially downward in arcuate direction thus increasing the compression on the wings and thereby gradually improving the transmissibility through the wings.

To accommodate angular misalignment between the bearing means C resulting from shaft runout relative to bracket A, the columns 45 and associated wings 50 which generally lie within the plane of shaft runout will undergo a bending and compression action as previously described for axial displacement. The columns 45 and associated wings which extend generally at right angles to the plane of shaft runout will undergo a slight twisting action about the dimension 46b of neck 46. The degree of twisting is permitted by the liberal circumferentially spacing of the columns 45 but limited to a slight degree by the arcuate base of the necks 46.

With the construction of the embodiment herein, transmissibility between the housing 20 and bearing means is maintained uniform without changing the radial spring rate of the resilient ring D.

While I have described my invention in connection with one specific embodiment and other alternative suggestions thereof, it is to be understood that this is by way of illustration and not by way of limitation and the scope of my invention is defined solely by the appended claims which should be construed as broadly as the prior art will permit.

I claim:

1. A resilient mounting effective to support an annular bearing assembly within an annular fixed bracket, the mounting comprising: an annular body of resilient material having an axis and an annular groove defined in its interior periphery effective to snugly receive said annular bearing, a plurality of columns extending radially outwardly from said body effective to resiliently and yieldably engage said annular fixed bracket, each of said support columns comprising a radially extending neck having a head portion extending transversely to said neck, said head portion interengaging with said fixed bracket, and wings independent of said columns extending radially outwardly from said body on opposite sides of each column, said wings having a shoulder adjacent to but slightly spaced from the axial extremities of said head whereby upon bending of said neck resulting from displacement of said bracket relative to said bearing, said head will progressively bear against one of said wings thereby maintaining the transmissibility of said mounting generally uniform.

2. A resilient mounting as in claim 1, in which each of said wings carry a conical surface and the conical surfaces of opposed wings being opposite to each other, and the axial extremities of each of said heads carrying conical surfaces complementary in configuration to said wing conical surfaces when the mounting is in the unstressed condition.

3. A resilient mounting as in claim 1, in which each neck has a generally rectangular cross-section with the shortest dimension being parallel to the axis of said body and being equal to or less than the average wing thickness.

4. A resilient mounting as in claim 1, in which the centers of said columns are circumferentially spaced apart between 20 and 24 degrees.

5. A resilient mounting as in claim 2, in which opposite wings have axially outer surfaces which are substantially flat and parallel to each other, the circumferential extremities of said wings being generally radially directed and slightly converging outwardly.

6. A resilient mounting as in claim 2, in which the conical surfaces of said head defines an included angle with the axis of said body which is between 50 and 70 degrees.

7. A resilient mounting as in claim 1, in which the radial dimension of said neck is generally equal to the axial thickness of said neck.

8. A center-bearing assembly, comprising: an annular bearing effective to rotatively support a drive-line centrally therein and having inner and outer races; an annular fixed bracket surrounding said bearing in radially spaced relationship and providing a radially inwardly facing surface having inwardly flared annular lips on opposite axial sides thereof; and a resilient ring having a resilient body mounted on said bearing outer race with means preventing relative axial movement therebetween, said resilient body having a plurality of equicircumferentially spaced resilient flexible columns extending radially outward to interengage with said bracket surface in a manner to place said columns under slight compression, said columns being effective to bend upon axial or angular displacement of said bearing relative to said bracket, said body also having wings extending radially outwardly adjacent opposite axial sides of each of said columns effective to yieldably resist bending of said columns during said displacement to maintain uniform transmissibility by said ring between said bearing and bracket.

9. A center bearing assembly as in claim 8, in which each of said columns have a generally rectangular cross section transverse to a radius of said assembly, one dimension of said cross section being twice as great at the other dimension of said cross section.

10. A center bearing assembly as in claim 8, in which each of said columns comprise a neck extending radially outwardly with a transverse extending head at the radial outer extremity, the outer surface of said head conforming fully to the contour of said bracket interior surface.

11. A center bearing assembly as in claim 10, in which said wings and said axial extremities of each head have mating complementary conical surfaces to facilitate the yieldable engagement of said wings with said columns upon said axial or angular displacement of the bearing relative to the fixed bracket.

References Cited by the Examiner

UNITED STATES PATENTS

| | | | |
|---|---|---|---|
| 2,159,545 | 5/1939 | Bartosch | 308—26 |
| 2,897,023 | 7/1959 | Burkhalter et al. | 308—184 |
| 2,906,572 | 9/1959 | Wroby | 308—184 |

FOREIGN PATENTS 1,160,310   12/1963   Germany.

MARTIN P. SCHWADRON, *Primary Examiner.*

R. F. HESS, *Assistant Examiner.*